US012294412B2

(12) United States Patent
Yang et al.

(10) Patent No.: US 12,294,412 B2
(45) Date of Patent: May 6, 2025

(54) SIGNAL DEMODULATION METHOD AND APPARATUS, COMPUTER STORAGE MEDIUM AND DEVICE

(71) Applicant: ACCELINK TECHNOLOGIES CO., LTD., Wuhan (CN)

(72) Inventors: Zhi Yang, Wuhan (CN); Cuihong Zhang, Wuhan (CN); Weidong Ma, Wuhan (CN)

( * ) Notice: Subject to any disclaimer, the term of this patent is extended or adjusted under 35 U.S.C. 154(b) by 170 days.

(21) Appl. No.: 18/015,071

(22) PCT Filed: Dec. 21, 2020

(86) PCT No.: PCT/CN2020/137956
§ 371 (c)(1),
(2) Date: Jan. 9, 2023

(87) PCT Pub. No.: WO2022/007338
PCT Pub. Date: Jan. 13, 2022

(65) Prior Publication Data
US 2023/0275673 A1    Aug. 31, 2023

(30) Foreign Application Priority Data
Jul. 8, 2020    (CN) .......................... 202010653051.X (51) Int. Cl.
*H04B 10/69*     (2013.01)
*H04B 10/60*     (2013.01)

(52) U.S. Cl.
CPC ............. *H04B 10/60* (2013.01); *H04B 10/69* (2013.01); *H04B 10/693* (2013.01)

(58) Field of Classification Search
CPC ....... H04B 10/60; H04B 10/69; H04B 10/693
(Continued)

(56) References Cited

U.S. PATENT DOCUMENTS

| | | | | |
|---|---|---|---|---|
| 5,594,577 A | * | 1/1997 | Majima | ................. H04B 10/69 398/79 |
| 7,349,469 B1 | | 3/2008 | Touzni et al. | |

(Continued)

FOREIGN PATENT DOCUMENTS

| | | |
|---|---|---|
| CN | 102123122 A | 7/2011 |
| CN | 201903351 U | 7/2011 |

(Continued)

OTHER PUBLICATIONS

International Search Report of PCT/CN2020/137956 filed Dec. 21, 2020.

(Continued)

*Primary Examiner* — Li Liu
(74) *Attorney, Agent, or Firm* — Chang & Hale LLP (57) ABSTRACT

Disclosed are a signal demodulation method and apparatus, a computer storage medium and a device. The method comprises: acquiring a signal to be demodulated; performing direct current blocking and bias processing on the signal to obtain a processed signal; comparing the processed signal with a preset decision signal, and obtaining a demodulation signal according to a comparison result. Thus, direct current blocking processing on a modulation signal can avoid dynamic changes of DC components caused by average power changes of carrier signals, avoiding wrongly demodulating the modulation signal. Bias processing after the direct current blocking on the modulation signal can further realize an AC signal decision without introducing a negative pressure source. A real-time decision on the processed signal via the preset decision signal can dynamically adapt the average power of carrier signals, thereby ensuring to correctly demodulate the modulation signal and improving the accuracy of demodulation results.

12 Claims, 4 Drawing Sheets

(58) Field of Classification Search
USPC .................................................. 398/208, 210
See application file for complete search history.

(56) References Cited

U.S. PATENT DOCUMENTS

| | | | |
|---|---|---|---|
| 2005/0260965 | A1 | 11/2005 | Ranganathan et al. |
| 2006/0227845 | A1* | 10/2006 | Degertekin .......... H04R 23/008 |
| | | | 372/102 |
| 2011/0026935 | A1* | 2/2011 | Akiyama ........... H04B 10/5053 |
| | | | 398/184 |
| 2016/0099777 | A1* | 4/2016 | Liu .................... H04B 10/6161 |
| | | | 398/159 |
| 2016/0294470 | A1* | 10/2016 | Roberts ................ H04L 25/4902 |
| 2019/0324298 | A1* | 10/2019 | Dayel ................... G02F 1/0147 |
| 2020/0322063 | A1* | 10/2020 | Yoshima ............. H04L 25/0296 |

FOREIGN PATENT DOCUMENTS

| | | |
|---|---|---|
| CN | 105450577 A | 3/2016 |
| CN | 108092719 A | 5/2018 |
| CN | 111970585 A | 11/2020 |
| WO | 01/03395 A1 | 1/2001 |

OTHER PUBLICATIONS

Written Opinion of the International Searching Authority of PCT/CN2020/137956 filed Dec. 21, 2020.
European Search Report dated May 29, 2024 for EP 20 94 4660.

\* cited by examiner

SIGNAL DEMODULATION METHOD AND APPARATUS, COMPUTER STORAGE MEDIUM AND DEVICE

CROSS-REFERENCE TO RELATED APPLICATION(S)

The present disclosure claims the priority of a Chinese patent application No. 202010653051.X filed on Jul. 8, 2020, the disclosure of which is hereby incorporated by reference herein in its entirety.

TECHNICAL FIELD OF THE DISCLOSURE

The present disclosure relates to a technical field of optical communication, and relates to, but is not limited to, a signal demodulation method, a signal demodulation apparatus, a computer storage medium and a device.

BACKGROUND

In an optical communication network application such as 5G front-haul, it is necessary to transmit the operation, administration and maintenance (OAM) data of each optical transmission channel without affecting the net load of the transparent bit stream of the system. At present, the usual implementation is to superpose low-frequency optical pilot tone signals on high-frequency carrier signals of an optical channel at a transmitting end, and then to try to demodulate the low-frequency optical pilot tone signals at a receiving end and identify the OAM data. However, in practical application, the problem that a change range of average power of the carrier signals in a wavelength channel is large is often encountered. At this time, after an electric signal detected by the optical power detector at the receiving end is low-pass filtered, a dynamic range of a direct current component in the electric signal thereof is large, and a post-stage amplification part is difficult to be adapted, resulting in the inability to properly restore the optical pilot tone signals.

SUMMARY

Embodiments of the present disclosure provide a signal demodulation method and apparatus, a computer storage medium and a device, which can dynamically adapt the average power of a carrier signal in a case where the change range of the average power of the carrier signal is large, so as to ensure the correct demodulation of a modulation signal, thereby improving the accuracy of demodulation result.

The technical solutions of the embodiments of the present disclosure are implemented as follows.

Embodiments of the present disclosure provide a signal demodulation method, and the method comprises:
acquiring a signal to be demodulated;
performing direct current blocking and bias processing on the signal to be demodulated to obtain a processed signal; and
comparing the processed signal with a preset decision signal, and obtaining a demodulation signal according to a comparison result.

Embodiments of the present disclosure provide a signal demodulation apparatus, and the signal demodulation apparatus comprises an acquiring unit, a direct current blocking and bias unit, and a decision unit; wherein
the acquiring unit is configured to acquire a signal to be demodulated;
the processing unit is configured to perform direct current blocking and bias processing on the signal to be demodulated to obtain a processed signal;
the decision unit is configured to compare the processed signal with a preset decision signal, and obtain a demodulation signal according to a comparison result.

Embodiments of the present disclosure provide a signal demodulation apparatus, and the signal demodulation apparatus comprises a memory and a processor, wherein
the memory is configured to store a computer program capable of operating on the processor; and
the processor is configured to execute any one of the signal demodulation methods when operating the computer program.

Embodiments of the present disclosure provide a computer storage medium, wherein the computer storage medium stores a signal demodulation program, when executed by at least one processor, implementing any one of the signal demodulation methods.

Embodiments of the present disclosure provide a device, wherein the device at least comprises any one of the signal demodulation apparatuses.

Embodiments of the present disclosure provide a signal demodulation method and apparatus, a computer storage medium and a device, and the method comprises: acquiring a signal to be demodulated; performing direct current blocking and bias processing on the signal to be demodulated to obtain a processed signal; and comparing the processed signal with a preset decision signal, and obtaining a demodulation signal according to a comparison result. In this way, dynamic changes of a direct current component caused by changes of average power of the carrier signal can be avoided by means of performing direct current blocking processing on the modulation signal, so that error demodulation of the modulation signal can be avoided; performing bias processing after the direct current blocking on the modulation signal can further realize a decision on an alternating current signal without introducing a negative pressure source; and performing a real-time decision on the processed signal by utilizing the preset decision signal can dynamically adapt the average power of the carrier signal, thereby ensuring the correct demodulation of the modulation signal and improving the accuracy of the demodulation results.

DETAILED DESCRIPTION

The technical solutions in the embodiments of the present disclosure will be described clearly and completely in combination with the drawings in the embodiments of the present disclosure.

In an optical communication network application such as 5G front-haul, it is necessary to transmit the operation, administration and maintenance (OAM) data of each optical transmission channel without affecting the net load of the transparent bit stream of the system. The usual implementation is to superpose a low-frequency optical pilot tone signal on a high-frequency carrier signal of the optical channel at a transmitting end, and try to demodulate the low-frequency optical pilot tone signal at a receiving end and identify the OAM data.

Figure 1:
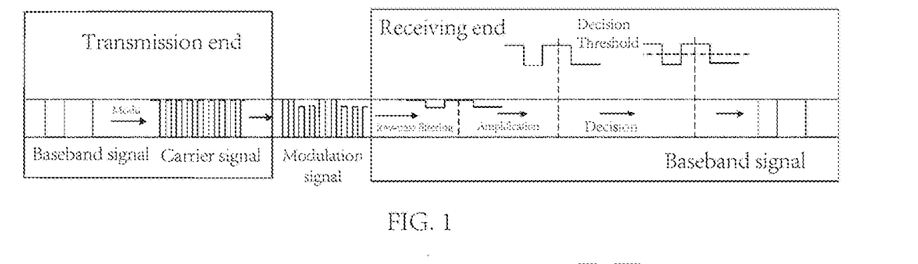
FIG. 1 is a flow diagram of a signal demodulation method provided by a related technical solution.

FIG. 1 shows a flow diagram of a signal demodulation method provided by a related technical solution. As shown in FIG. 1, the modulation and demodulation process of the optical pilot tone signal is as follows: (1) at a transmitting end, a baseband signal and a carrier signal are modulated together, so as to obtain a modulation signal, and the modulation signal is sent to a receiving end, wherein the baseband signal may be a low-frequency optical pilot tone signal, and the carrier signal may be a high-frequency, data-stream net-load signal; (2) after the modulation signal being received by a receiving end, the high-frequency carrier signal in the modulation signal is removed by means of low-pass filtering, and then is amplified; and the amplified signal is decided by using a decision threshold (abbreviated to "DE TH"), thereby demodulating and obtaining the afore-mentioned baseband signal (i.e. low-frequency optical pilot tone signal). That is to say, the common technology of modulation and demodulation of the optical pilot tone signal is as follows: at the transmitting end, the low-frequency OAM data is modulated to the average optical power of a high-frequency carrier signal by means of an electric adjustable optical attenuator, an optical transmitter with a low-speed modulation function and the like; and at the receiving end, the OAM data is restored by mean of performing low-pass filtering, amplification and re-decision on the optical power signal of the channel.

Figure 2:
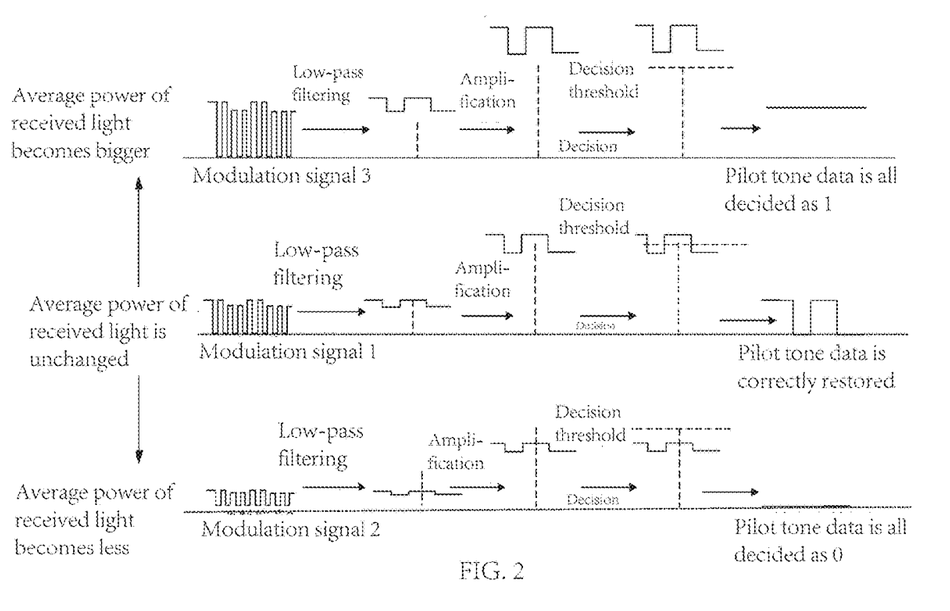
FIG. 2 is an effect diagram of a signal demodulation method provided by a related technical solution.

However, in practical application, referring to FIG. 2, an effect diagram of a signal demodulation method provided by the related technical solution is shown. As shown in FIG. 2, in a case where the average power of the received light remains unchanged, the receiving end performs low-pass filtering, amplification processing and decision on the modulation signal 1. Since the gain in the amplification processing is matched with the modulation signal 1, a correct demodulation result can be obtained by comparing the processed signal with a decision threshold; that is, the pilot tone data is correctly restored. In a case where the average power of the received light becomes bigger, the receiving end performs low-pass filtering, amplification processing and decision on the modulation signal 2. At this time, the gain in the amplification processing is too large relative to the modulation signal 2, so that any voltage amplitude of the processed signal is higher than the decision threshold value; that is, all of the pilot tone data are decided as 1, thus the modulation signal is totally lost. In a case where the average power of the received light becomes smaller, the receiving end performs low-pass filtering, amplification processing and decision on the modulation signal 3. At this time, the gain in the amplification processing is too small relative to the modulation signal 3, so that any voltage amplitude of the processed signal is lower than the decision threshold value; that is, all of the pilot tone data are decided as 0, thus the modulation signal is also totally lost.

Based on this, the present disclosure provides a signal demodulation method which comprises: acquiring a signal to be demodulated; performing direct current blocking and bias processing on the signal to be demodulated to obtain a processed signal; and comparing the processed signal with a preset decision signal, and obtaining a demodulation signal according to a comparison result. Thus, dynamic changes of a direct current component caused by changes of average power of the carrier signal can be avoided by means of performing direct current blocking processing on the modulation signal, so that the error demodulation of the modulation signal can be avoided. Moreover, bias processing after the direct current blocking on the modulation signal can further realize a decision on an alternating current signal without introducing a negative pressure source. In addition, performing a real-time decision on the processed signal by utilizing the preset decision signal can dynamically adapt the average power of the carrier signal, thereby ensuring the correct demodulation of the modulation signal and improving the accuracy of the demodulation results.

Various embodiments of the present disclosure will be described in detail below with reference to the accompanying drawings.

Figure 3:
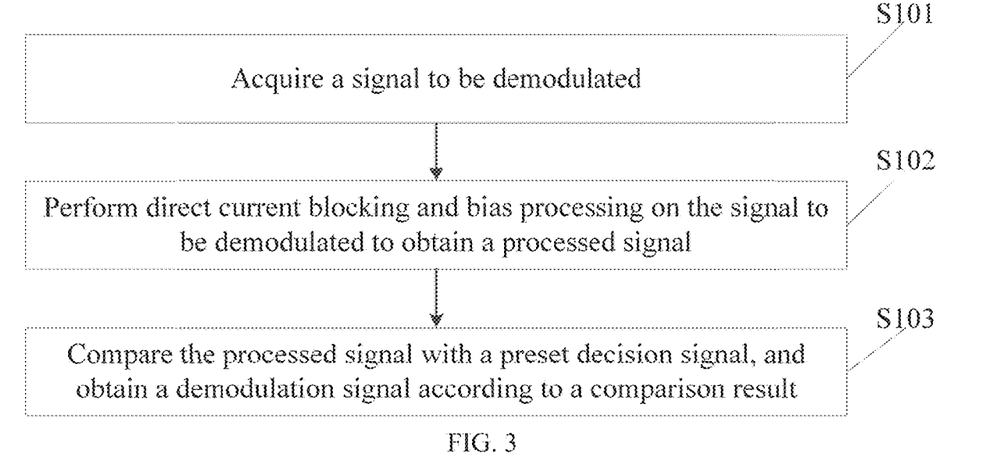
FIG. 3 is a flow diagram of a signal demodulation method provided by an embodiment of the present disclosure.

In one embodiment of the present disclosure, referring to FIG. 3, a flow diagram of a signal demodulation method provided by an embodiment of the present disclosure is shown. As shown in FIG. 3, the method may comprise:

Step 101: acquiring a signal to be demodulated;

It should be noted that the signal demodulation method in the embodiments of the present disclosure may be applied to a signal demodulation apparatus, or a device integrating the signal demodulation apparatus, such as a smart phone, a tablet computer, a notebook computer, a palmtop computer, a personal digital assistant (PDA), a computer, a server, etc., and the embodiments of the present disclosure are not specifically limited.

It should also be noted that the signal demodulation method in the embodiment of the present disclosure may be applied to an optical pilot tone signal. The transmission of the optical pilot tone signal is performed based on the digital modulation technology, i.e., superposing a low-frequency optical pilot tone signal on a high-frequency carrier signal of an optical channel at a transmitting end, trying to demodulate the low-frequency optical pilot tone signal at a receiving end, and identifying OAM data. Therefore, for the receiving end, a signal to be demodulated is acquired, and the signal to be demodulated refers to the low-frequency optical pilot tone signal after the carrier signal is filtered out.

In order to acquire the signal to be demodulated, the receiving end needs to filter out the carrier signal in the received signal. Therefore, in some embodiments, said acquiring the signal to be demodulated may comprise:

receiving an optical power signal;

performing photoelectric conversion on the optical power signal to obtain a modulation signal;

performing low-pass filtering processing on the modulation signal, so as to obtain the signal to be demodulated.

It should be noted that the optical power signal sent by the transmitting end is received by the receiving end, and is converted into a modulation signal through the photoelectric conversion. Since the modulation signal comprises a high frequency signal used as the carrier signal and a low frequency signal representing the optical pilot tone signal, it is necessary to perform low-pass filtering on the modulation signal, so as to filter out the high frequency signal therein to obtain the signal to be demodulated. The low-pass filtering refers to filtering the signal with a frequency higher than a preset frequency threshold in the modulation signal. The preset frequency threshold needs to be determined according to the frequency of the carrier, i.e., it is determined according to the parameters of the light transmitting module of the transmitting end.

Step 102: performing direct current blocking and bias processing on the signal to be demodulated to obtain a processed signal;

It should be noted that in the process of sending the signal to the receiving end from the transmitting end, the optical power may have a certain fluctuation range, so that the dynamic change range of the direct current component in the modulation signal after being converted into an electric signal is very large, resulting in subsequent gains, and the amplified parameters being unable to be accurately matched. Therefore, performing direct current blocking processing on the modulation signal can avoid the impact of the direct current signal on subsequent processing. Meanwhile, bias processing may be performed after the direct current blocking processing, i.e., a bias voltage is applied to the signal obtained by performing the direct current blocking processing, so as to obtain a processed signal. Thus, the presence of negative potential in the signal may be avoided, and there is no need to introduce additional negative pressure source in subsequent processing.

Further, in some embodiments, said performing direct current blocking and bias processing on the signal to be demodulated so as to obtain a processed signal may comprise:

performing direct current blocking processing on the signal to be demodulated to obtain an alternating current signal;

superposing the alternating current signal with a preset bias voltage signal to obtain a superposed signal;

performing gain processing on the superposed signal according to a preset gain coefficient to obtain the processed signal.

It should be noted that the alternating current signal is obtained after the signal to be demodulated is processed through direct current blocking processing, and there is only an alternating current component in the alternating current signal, which corresponds to the optical pilot tone signal. Then, a preset bias voltage is applied to the alternating current signal, which is equivalent to superposing the alternating current signal with the preset bias voltage signal, so as to obtain the superposed signal. In addition, the preset bias voltage at least makes the negative level no longer exist in the superposed signal, and thus may avoid introducing a negative pressure source into the circuit.

For the superposed signal, a gain may be performed according to a preset gain coefficient, so that the superposed signal is amplified to obtain a processed signal, and thus increases the amplitude of voltage fluctuation, so as to facilitate performing the subsequent decision.

Herein, the preset gain coefficient may comprise a first preset gain coefficient and a second preset gain coefficient. Therefore, in some embodiments, said performing gain processing on the superposed signal according to a preset gain coefficient to obtain the processed signal comprises:

performing gain processing on the alternating current signal in the superposed signal based on the first preset gain coefficient, and performing gain processing on the preset bias voltage signal in the superposed signal based on the second preset gain coefficient, so as to obtain the processed signal, wherein the first preset gain coefficient is equal to or not equal to the second preset gain coefficient.

It should be noted that when gain processing is performed on a superposed signal, the gain can be simultaneously performed on a portion therein corresponding to the alternating current signal and a portion therein corresponding to the preset bias voltage signal. At this time, the preset gain coefficient may only comprise a first preset gain coefficient and a second preset gain coefficient. The first preset gain coefficient is used for performing a gain on the portion of the alternating current signal in the superposed signal, and the second preset gain coefficient is used for performing a gain on the portion of the preset bias voltage signal in the superposed signal.

It should also be noted that the first preset gain coefficient may be equal to the second preset gain coefficient. Alternatively, the first preset gain coefficient may not be equal to the second preset gain coefficient. Herein, the inequality between the first preset gain coefficient and the second preset gain coefficient is realized by designing a hardware structure of the gain circuit, such as introducing a cancellation sub-circuit, to enable the preset gain coefficients of the two portions in the superposed signal to be unequal.

Step 103: comparing the processed signal with a preset decision signal, and obtaining a demodulation signal according to a comparison result.

It should be noted that the preset decision signal is related to the preset bias voltage applied in the bias processing. Specifically, the level value of the preset decision signal is a value obtained after the preset bias voltage is gained by a preset gain coefficient.

By comparing the processed signal with the preset decision signal, i.e., comparing the level value of the processed signal with the level value of the preset decision signal at the same time, the demodulation signal may be determined, and the optical pilot tone data is finally obtained. Since the preset decision signal is related to the bias processing, the preset decision signal and the processed signal are correlated. If the bias voltage applied during bias processing is relatively high, the level value of the preset decision signal is also relatively high, thus the adaptive adjustment of the preset decision signal is realized. In addition, the preset decision signal and the processed signal enter the decision module at the same time as inputs, thus the real-time decision of the processed signal is realized. In this way, the OAM data can also be correctly demodulated when the average power of the carrier signal changes dynamically.

Further, in some embodiments, before comparing the processed signal with the preset decision signal, the method may further comprise:

performing gain processing on the preset bias voltage signal according to the second preset gain coefficient, so as to obtain the preset decision signal.

It should be noted that the preset bias voltage signal is a portion additionally added in order to perform a decision on the optical pilot tone signal in the post-processing process, and does not belong to the original optical pilot tone signal;

that is, the preset decision signal substantially refers to a portion corresponding to the preset bias voltage signal. Therefore, if the preset bias voltage signal is gained through the second preset gain coefficient, the preset decision signal is also obtained after the preset bias voltage signal is gained through the second preset gain coefficient.

When performing gain processing on the superposed signal, the gain may be performed only on the alternating current signal portion therein. Therefore, in some embodiments, in a case where the first preset gain coefficient is not equal to the second preset gain coefficient and the second preset gain coefficient is equal to 1, the method may further comprise:

determining the preset bias voltage signal as the preset decision signal.

It should be noted that when performing gain processing on the superposed signal, the gain may be performed only on the alternating current signal therein, i.e., the second preset gain coefficient is equal to 1. In this case, the preset bias voltage signal is just the preset decision signal.

Further, in some embodiments, said comparing the processed signal with a preset decision signal, and obtaining a demodulation signal according to a comparison result may comprise:

comparing the processed signal with the preset decision signal;

deciding the demodulation signal as a first digital signal in a case where the processed signal is greater than or equal to the preset decision signal; and deciding the demodulation signal as a second digital signal in a case where the processed signal is less than the preset decision signal.

It should be noted that the processed signal is compared with the preset decision signal in real time; if the processed signal is greater than or equal to the preset decision signal, then the demodulation signal corresponds to the first digital signal; and if the processed signal is less than the preset decision signal, then the demodulation signal corresponds to the second digital signal. The optical pilot tone data is obtained by a final analysis according to the first digital signal and the second digital signal.

Further, in some embodiments, the level amplitude of the first digital signal is 1, and the level amplitude of the second digital signal is 0.

It should be noted that the level amplitude of the first digital signal is 1, and the level amplitude of the second digital signal is 0. That is to say, if the processed signal is greater than or equal to the preset decision signal, then the corresponding digital signal is 1; if the processed signal is less than the preset decision signal, then the corresponding digital signal is 0.

The modulation signal may be mixed with noise in the transmission process, resulting in an erroneous decision. Therefore, in some embodiments, said comparing the processed signal with a preset decision signal may comprise:

performing a plurality of sampling on the processed signal and the preset decision signal, so as to obtain a plurality of groups of sampling sets, wherein each group of sampling sets comprises demodulation level amplitude obtained by sampling the processed signal and decision level amplitude obtained by sampling the preset decision signal;

comparing the demodulation level amplitude in each group of sampling sets within the plurality of groups of sampling sets with the decision level amplitude, so as to determine a first quantity and a second quantity, wherein the first quantity is a quantity of the demodulation level amplitude that is greater than or equal to the decision level amplitude, and the second quantity is a quantity of demodulation level amplitude that is less than the decision level amplitude;

determining the processed signal is greater than or equal to the preset decision signal in a case where the first quantity is greater than or equal to the second quantity; and determining the processed signal is less than the preset decision signal in a case where the first quantity is less than the second quantity.

It should be noted that the signal is mixed with some noise due to errors or other environmental factors in the transmission process. Therefore, the level amplitude of the input signal needs to be sampled for multiple times and decided during the analysis process, so as to increase the reliability of demodulation. That is to say, in the process of analyzing a signal, a plurality of level sampling is respectively performed from the alternating current signal and the preset decision signal, a plurality of decisions are made according to the result of the plurality of level sampling, and a final demodulation signal is determined according to a large number of result values in the decision result. Specifically, each level sampling will obtain one group of sampling sets, which comprises the demodulation level amplitude obtained from the processed signal and the decision level amplitude obtained by sampling from the preset decision signal.

For example, the time width corresponding to one specific signal is 1 s (i.e., one digital signal is analyzed every 1 s, and finally a optical pilot tone signal is formed), and level sampling can be performed 5 times within 1 s. Each level sampling comprises obtaining the demodulation level amplitude from an alternating current signal, and obtaining the preset decision amplitude from the preset decision signal. Then the demodulation level amplitude is compared with the preset decision amplitude respectively, so as to obtain the first quantity and the second quantity. For example, in 5 results, there are 4 times where the results are that the demodulation level amplitude is greater than or equal to the preset decision amplitude, then the first quantity is 4, and the second quantity is 1. Since the first quantity is greater than the second quantity, the processed signal is greater than the preset decision signal, and the corresponding digital signal is 1.

It should also be noted that, in general, the erroneous decision of the signal is mainly due to the mixed noise points. The duration of the noise point is far less than the analysis time of one signal, and thus, in the plurality of level sampling, the number of times of sampling noise points would be very small. Therefore, an erroneous decision of the signal can be avoided by using a plurality of level sampling method.

It should also be noted that performing decision by sampling the levels for a plurality of times can also be designed as the following mechanism, i.e., averaging the demodulation level values obtained many times, at the time averaging the preset decision amplitude obtained many times, and using the comparison result of the two average values as the comparison result of the processed signal and the preset decision signal.

Figure 4:
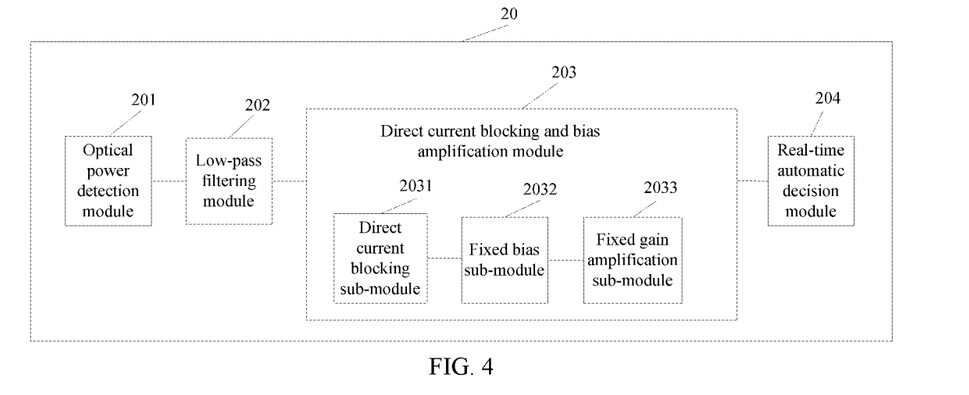
FIG. 4 is a schematic structural diagram of a signal demodulation apparatus provided by an embodiment of the present disclosure.

Referring to FIG. 4, a schematic structural diagram of a signal demodulation apparatus 20 provided by an embodiment of the present disclosure is shown. As shown in FIG. 4, the signal demodulation apparatus 20 may comprise an optical power detection module (abbreviated to OP PO DE MO) 201, a low-pass filtering module (abbreviated to LO-PA FI MO) 202, a direct current blocking and bias amplification module 203, and a real-time automatic decision module (abbreviated to RT AU DE MO) 204, wherein the direct current blocking and bias amplification module 203 may further comprise a direct current blocking and bias amplification sub-module (abbreviated to DC BL SM) 2031, a fixed bias sub-module (abbreviated to FI BI SM) 2032, and a fixed gain amplification sub-module (abbreviated to FI GA AM SM) 2033. For the signal demodulation apparatus 20, the working process thereof mainly comprises the following steps:

(1) For the optical power detection module 201, it is mainly configured to detect the optical power incident on the surface thereof, and convert the optical power into a corresponding electrical signal, i.e., receiving a modulation signal transmitted from a transmitting end;

(2) For the low-pass filtering module, it is mainly configured to perform low-pass filtering on a modulation signal, remove a high-frequency carrier signal, so as to obtain a signal to be demodulated;

(3) For the direct current blocking and bias amplification module 203, it is mainly configured to perform direct current blocking processing, apply a bias voltage, and perform gain amplification on the signal to be demodulated after low-pass filtering, wherein the direct current blocking and bias amplification module 2031 is configured to perform direct current blocking processing on the signal to be demodulated to obtain an alternating current signal, the fixed bias sub-module 2032 is configured to apply a bias voltage to the alternating current signal to obtain a superposed signal, and the fixed gain amplification sub-module 2033 is configured to perform gain amplification on the superposed signal, so as to obtain a processed signal;

(4) For the real-time automatic decision module 204, it is mainly configured to perform a real-time decision on the processed signal by using a preset decision signal, and output an optical pilot tone signal.

In an application scenario, the signal demodulation method of the related technology has the following problems: if the change range of average power of the carrier signal of a wavelength channel is relatively large, the voltage amplitude after low-pass filtering at the receiving end circuit change greatly, and subsequent amplification and decision may not be adapted, so that the pilot tone signal cannot be correctly restored. On this basis, one improvement method is to perform direct current blocking on the low-pass filtering signal and then amplify it. However, this requires the circuit to introduce a negative voltage power supply, which increases the complexity and cost of the circuit design. Another improvement method is sampling the average power of the carrier signal in a wavelength channel, and on this basis, dynamically adjusting the gain of the amplification circuit. However, this also increases the complexity and cost of the circuit design, and there still exists the problem that the pilot tone signal cannot be correctly restored in the dynamic adjustment process. The signal demodulation method provided by the present disclosure may correctly demodulate the pilot tone signal without adding the negative pressure source, which may solve the following technical problems and obtain the corresponding technical effects:

When the change range of average optical power of the carrier signal is large, after the electric signal detected based on the optical power is low-pass filtered at the receiving end, the dynamic range of the direct current component in the electric signal is large, as a result, the post-stage amplification portion is difficult to be adapted, which will cause the inability to properly restore the optical pilot tone signal at the high end or the low end of the average optical power of the carrier signal. Adopting dynamic gain amplification will increase complexity and cost of design, or adopting an alternating current signal amplification mode also needs the support of a negative voltage power supply. The direct current blocking and bias amplification module in the embodiment of the present disclosure, avoids the dynamic range of the direct current component of the amplified signal from being too large through performing direct current blocking processing on the signal; meanwhile, it gives a fixed direct current bias to the alternating current signal, so the gain amplification signal can also be fixed without the need for a negative voltage power supply.

On the other hand, the modulation mode commonly used by the transmitting end is to control the modulation depth according to a fixed percentage of the average optical power. When the change range of the average optical power of the carrier signal is large, after the electric signal detected based on the optical power is low-pass filtered at the receiving end, the dynamic range of the alternating current component therein is also relatively large. After the amplification, it is difficult to cover a wide range by using fixed level decision condition, so it is prone to produce an erroneous decision; by adopting a mode that dynamically adjust the decision according to the average power of the received light, the complexity and cost of the design will increase, and this belongs to a remedial measure after discovering the average power change of the received light, which will inevitably cause the erroneous decision in the process of dynamic change of the average power of the light. The real-time automatic decision module in the embodiment of the present disclosure compares the signal carrying the pilot tone data with the amplified bias signal in real time, which essentially extracts the alternating current component therein, and thus can directly decide the pilot tone signal to be logic 1 or 0, which avoids dynamically adjusting the decision level. Meanwhile, it is also a real-time decision for the pilot tone signal, and demodulation can also be correctly performed when the average power of the carrier signal changes dynamically.

Embodiments of the present disclosure provide a signal demodulation method, and the method may comprise: acquiring a signal to be demodulated; performing direct current blocking and bias processing on the signal to be demodulated to obtain a processed signal; and comparing the processed signal with a preset decision signal, and obtaining a demodulation signal according to a comparison result. In this way, dynamic changes of direct current component caused by average power changes of the carrier signal can be avoided by means of performing direct current blocking processing on the modulation signal, so that the error demodulation of the modulation signal can be avoided; performing bias processing after the direct current blocking on the modulation signal can further realize a decision on an alternating current signal without introducing a negative pressure source. In addition, performing a real-time decision on the processed signal by utilizing the preset decision signal can dynamically adapt the average power of the carrier signal, thereby ensuring the correct demodulation of the modulation signal and improving the accuracy of the demodulation results.

Figure 5:
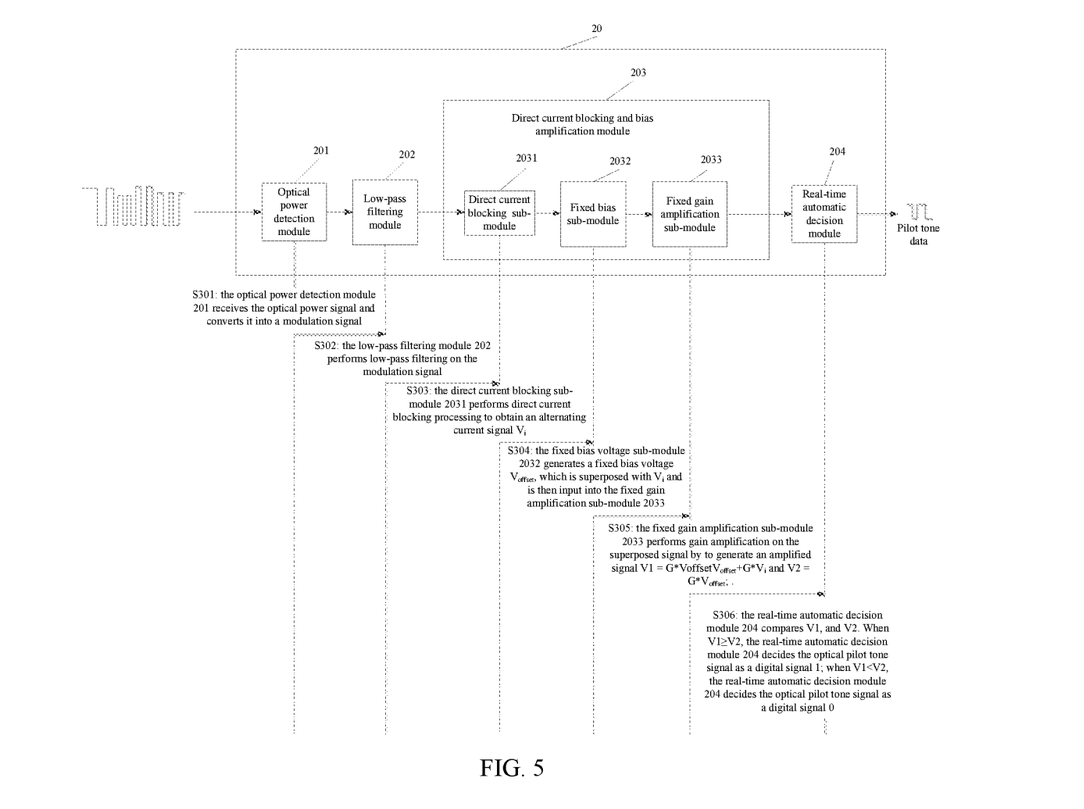
FIG. 5 is a workflow diagram of a signal demodulation apparatus provided by an embodiment of the present disclosure.

In another embodiment of the present disclosure, referring to FIG. 5, a workflow diagram of a signal demodulation apparatus 20 provided by an embodiment of the present disclosure is shown. As shown in FIG. 5, the signal demodulation apparatus 20 may comprise an optical power detection module 201, a low-pass filtering module 202, a direct current blocking and bias amplification module 203 and a real-time automatic decision module 204, wherein the direct current blocking and bias amplification module 203 may further comprise a direct current blocking sub-module 2031, a fixed bias sub-module 2032, and a fixed gain amplification sub-module 2033. Specifically, the working process of the signal demodulation apparatus 20 may comprise the following steps.

At Step S301, the optical power detection module 201 receives an optical power signal and converts it into a modulation signal.

It should be noted that, at a receiving end, the optical power detection module 201 converts the light incident thereon into an electrical signal, and accordingly obtains the modulation signal, and inputs the modulation signal into the low-pass filtering module 202.

At Step S302, the low-pass filtering module 202 performs low-pass filtering on the modulation signal.

It should be noted that the low-pass filtering module 202 removes a high-frequency carrier signal in the modulation signal, so as to obtain an electrical signal corresponding to an optical pilot tone signal, and inputs the electrical signal into the direct current blocking sub-module 2031.

At Step S303, the direct current blocking sub-module 2031 performs direct current blocking processing to obtain an alternating current signal $V_i$.

It should be noted that the direct current blocking sub-module 2031 performs direct current blocking processing on the input signal to obtain the alternating current signal $V_i$, which may avoid the direct current signal fluctuation caused by the optical power fluctuation, and inputs the alternating current signal $V_i$ into the fixed bias voltage sub-module 2032.

At Step S304, the fixed bias voltage sub-module 2032 generates a fixed bias voltage $V_{offset}$, which is superposed with $V_i$ and is then input into the fixed gain amplification sub-module 2033.

It should be noted that the fixed voltage sub-module 2032 generates a fixed bias voltage $V_{offset}$, which avoids the signal to generate a negative level, and thus there is no need to introduce a negative pressure source in the demodulation circuit. The fixed bias voltage $V_{offset}$ is superposed with $V_i$ and is then input into the fixed gain amplification sub-module 2033.

At Step S305, the fixed gain amplification sub-module 2033 performs gain amplification on the superposed signal to generate an amplified signal $V1=G*V_{offset}+G*V_i$ and $V2=G*V_{offset}$.

It should be noted that the fixed gain amplification sub-module 2033 performs gain amplification on the input signal, generating an amplified signal $V1=G*V_{offset}+G*V_i$ and $V2=G*V_{offset}$, and outputs V1 and V2 to the real-time automatic decision module 204 simultaneously. Herein, V1 is the afore-mentioned processed signal, and V2 is the afore-mentioned preset decision signal.

It should also be noted that the fixed gain amplification sub-module 2033 may be designed to respectively produce different gains G1 and G2 for $V_{offset}$ and $V_i$. In addition, the fixed gain amplification sub-module 2033 may be designed to amplify only the alternating current signal $V_i$, i.e., G1=1.

At Step S306, the real-time automatic decision module 204 compares V1 and V2. When V1≥V2, the real-time automatic decision module 204 decides the optical pilot tone signal as a digital signal 1; when V1<V2, the real-time automatic decision module 204 decides the optical pilot tone signal as a digital signal 0.

It should be noted that the inputs of the real-time automatic decision module 204 are a signal V1 and a signal V2. The real-time automatic decision module 204 compares the input signals V1 and V2. It decides the optical pilot tone signal as the digital signal 1 when V1≥V2, and decides the optical pilot tone signal as the digital signal 0 when V1<V2.

It should also be noted that the real-time automatic decision module may use a way of sampling the level amplitude of the input signal for multiple times, so as to increase the reliability of the decision.

Figure 6:
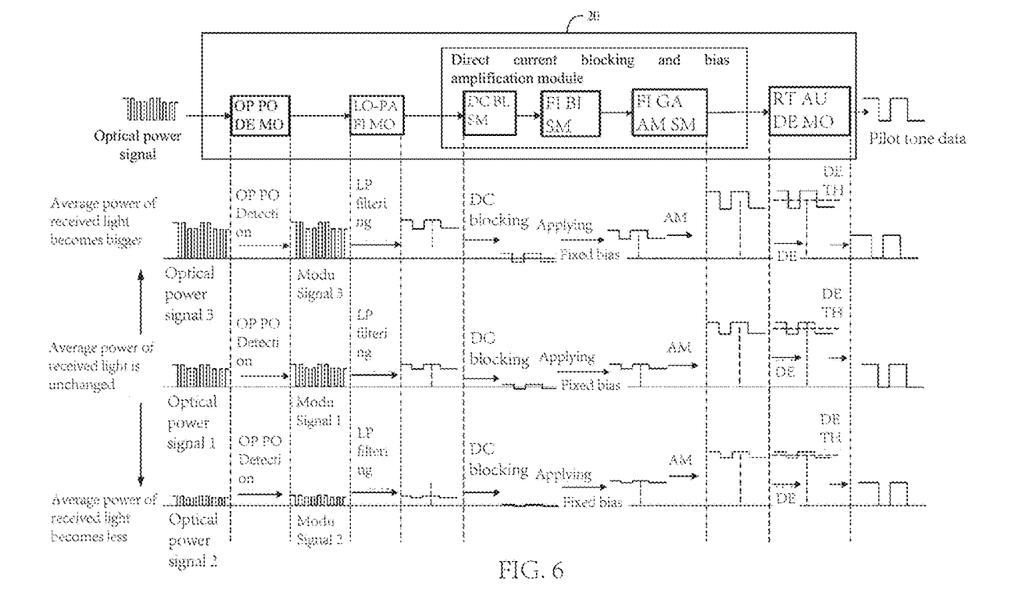
FIG. 6 is an effect diagram of a signal demodulation method provided by an embodiment of the present disclosure.

In summary, the embodiments of the present disclosure provide a demodulation method of an optical pilot tone signal, and in particular, to a decision method of an optical pilot tone signal when the average power of a carrier signal changes dynamically. The apparatus is composed of an optical power sampling module, a low-pass filtering module, a direct current blocking and bias amplification module, and a real-time automatic decision module which are connected in sequence, and can correctly restore an optical pilot tone signal when the average power of a carrier signal changes dynamically. As shown in FIG. 6, the signal demodulation apparatus 20 makes an optical power signal sequentially pass through an optical power detection module, a low-pass filtering module, a direct current blocking sub-module, a fixed bias sub-module, a fixed gain amplification sub-module, and a real-time automatic decision module, successively performing processing operations on the optical power signal, such as optical power detecting, low-pass filtering, direct current blocking, fixed bias applying, amplification and decision, and the like, and finally obtains the demodulated pilot tone data. In the embodiment of the present disclosure, (1) in a case where the average power of the received light remains unchanged, the signal demodulation apparatus 20 performs processing on the modulation signal 1, such as low-pass filtering, direct current blocking processing, fixed bias applying, amplification and decision. Since the direct current component in the modulation signal 1 is removed by the direct current blocking processing, and the decision threshold in the decision process is determined according to the applied fixed bias voltage and gain coefficient, which is matched with the processed signal, a correct demodulation result can be obtained by comparing the processed signal with the decision threshold, i.e., the pilot tone data is correctly restored;

(2) in a case where the average power of the received light becomes bigger, the signal demodulation apparatus 20 performs processing on the modulation signal 2, such as low-pass filtering, direct current blocking processing, fixed bias applying, amplification and decision. Since the direct current blocking processing removes the changes of the direct current component caused by the change of the optical power, and the decision threshold in the decision process is determined according to the applied fixed bias voltage and gain coefficient, which is matched with the processed signal, a correct demodulation result can be obtained, i.e., the pilot tone data is correctly restored;

(3) in a case where the average power of the received light becomes smaller, the signal demodulation apparatus 20 performs processing on the modulation signal 2, such as low-pass filtering, direct current blocking processing, fixed bias applying, amplification and decision. Since the direct current blocking processing removes the changes of the direct current component caused by the change of the optical power, and the decision threshold in the decision process is determined according to the applied fixed bias voltage and gain coefficient, which is matched with the processed signal, a correct demodulation result can be obtained, i.e., the pilot tone data is correctly restored.

It can be seen that since the decision threshold in the real-time automatic decision module is associated with the processing parameters in the fixed bias sub-module and the fixed gain amplification sub-module, an adaptive adjustment of the decision threshold is realized. Moreover, the direct current blocking processing removes the direct current component in the modulation signal which changes due to the change of the average optical power. Therefore, in a scenario where the average optical power becomes bigger or smaller, the optical pilot tone signal can be correctly restored. That is to say, the signal demodulation method provided by embodiments of the present disclosure may solve the following problems:

(1) When the change range of the average optical power of the carrier signal is large, after the electrical signal detected based on the optical power is low-pass filtered, the dynamic range of the direct current component in the electrical signal is large, so the post-stage amplification portion is difficult to be adapted, which will cause the inability to properly restore the optical pilot tone signal at the high end or the low end of the average optical power of the carrier signal. Adopting dynamic gain amplification will increase complexity and cost of design, or adopting an alternating current signal amplification mode also needs the support of a negative voltage power supply. The direct current blocking and bias amplification module in the embodiment of the present disclosure, avoids the direct-current dynamic range of the amplified signal from being too large through performing direct current blocking processing on the signal; meanwhile, it gives a fixed direct current bias to the alternating current signal, so the signal can also be amplified with a fixed gain, without the need for a negative voltage power supply.

(2) On the other hand, the modulation mode commonly used by the transmitting end is to control the modulation depth according to a fixed percentage of the average optical power. When the change range of the average optical power of the carrier signal is large, after the electric signal detected based on the optical power is low-pass filtered at the receiving end, the dynamic range of the alternating current component therein is also relatively large. After the amplification, it is difficult to cover a wide range by using fixed level decision condition, so it is prone to produce an erroneous decision. In addition, by adopting a mode that dynamically adjust the decision according to the average power of the received light, the complexity and cost of the design will increase, and this belongs to a remedial measure after discovering the average power change of the received light, which will inevitably cause erroneous decision in the process of dynamic change of the average power of the light. The real-time automatic decision module in the embodiment of the present disclosure compares the signal carrying the pilot tone data with the amplified bias signal in real time, which essentially extracts the alternating current component therein, and thus can directly decide the pilot tone signal to be logic 1 or 0, which avoids dynamically adjusting the decision level. Meanwhile, it is also a real-time decision for the pilot tone signal, and demodulation can also be correctly performed when the average power of the carrier signal changes dynamically.

Embodiments of the present disclosure provide a signal demodulation method, and the specific implementations of the afore-mentioned embodiments have been described in detail. It can be seen that the dynamic changes of the direct current component caused by average power changes of the carrier signal can be avoided by means of performing direct current blocking processing on the modulation signal, so that the error demodulation of the modulation signal can be avoided; performing bias processing after the direct current blocking on the modulation signal can further realize a decision on an alternating current signal without introducing a negative pressure source. In addition, performing a real-time decision on the processed signal by utilizing the preset decision signal can dynamically adapt the average power of the carrier signal, thereby ensuring the correct demodulation of the modulation signal and improving the accuracy of the demodulation result.

Figure 7:
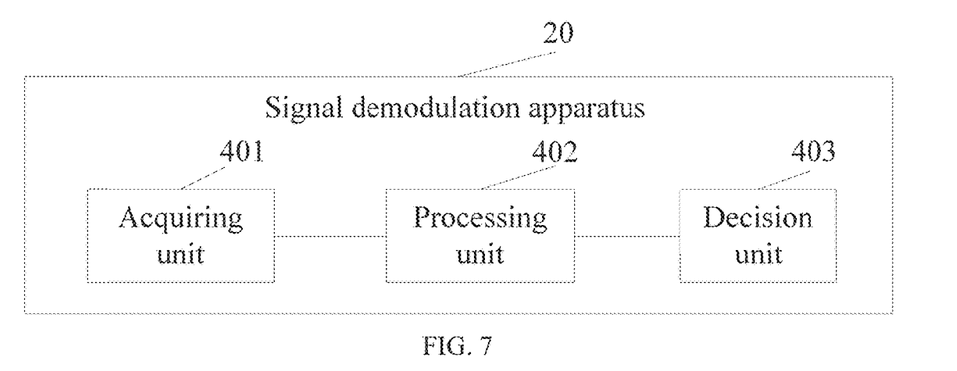
FIG. 7 is a schematic structural diagram of another signal demodulation apparatus provided by an embodiment of the present disclosure.

In yet another embodiment of the present disclosure, referring to FIG. 7, a composition structure of another signal demodulation apparatus 20 provided by embodiments of the present disclosure is shown. As shown in FIG. 7, the signal demodulation apparatus 20 comprises an acquiring unit 401, a processing unit 402 and a decision unit 403, wherein, The acquiring unit 401 is configured to acquire a signal to be demodulated;

The processing unit 402 is configured to perform direct current blocking and bias processing on the signal to be demodulated to obtain a processed signal;

The decision unit 403 is configured to compare the processed signal with a preset decision signal, and obtain a demodulation signal according to a comparison result.

In some embodiments, the acquiring unit 401 is specifically configured to receive an optical power signal; perform photoelectric conversion on the optical power signal to obtain a modulation signal; and perform low-pass filtering processing on the modulation signal to obtain the signal to be demodulated.

In some embodiments, the processing unit 402 is specifically configured to perform direct current blocking processing on the signal to be demodulated to obtain an alternating current signal; superpose the alternating current signal with a preset bias voltage signal to obtain a superposed signal; and perform gain processing on the superposed signal according to a preset gain coefficient to obtain the processed signal.

In some embodiments, the processing unit 402 may further be configured to perform gain processing on the alternating current signal in the superposed signal based on a first preset gain coefficient, and perform gain processing on a preset bias voltage signal in the superposed signal based on a second preset gain coefficient, so as to obtain the processed signal, wherein the first preset gain coefficient is equal to or not equal to the second preset gain coefficient.

Figure 8:
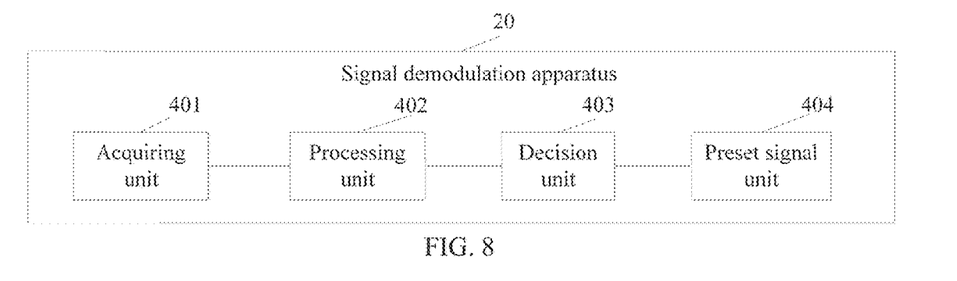
FIG. 8 is a schematic structural diagram of another signal demodulation apparatus provided by an embodiment of the present disclosure.

In some embodiments, as shown in FIG. 8, the signal demodulation apparatus 20 may further comprise a preset signal unit 404, which is specifically configured to perform gain processing on the preset bias voltage signal according to the second preset gain coefficient, so as to obtain the preset decision signal.

In some embodiments, in a case where the first preset gain coefficient is not equal to the second preset gain coefficient and the second preset gain coefficient is equal to 1, the preset signal unit 404 is further configured to determine the preset bias voltage signal as the preset decision signal.

In some embodiments, the decision unit 403 is specifically configured to compare the processed signal with the preset decision signal; determine the demodulation signal to be a first digital signal in a case where the processed signal is greater than or equal to the preset decision signal; and determine the demodulation signal to be a second digital signal in a case where the processed signal is less than the preset decision signal.

In some embodiments, the level amplitude of the first digital signal is 1, and the level amplitude of the second digital signal is 0.

In some embodiments, the decision unit 403 may further be configured to perform a plurality of sampling on the processed signal and the preset decision signal, so as to obtain a plurality of groups of sampling sets, wherein each group of sampling sets comprises demodulation level amplitude obtained by sampling the processed signal and decision level amplitude obtained by sampling the preset decision signal; compare a demodulation level amplitude in each group of sampling sets within the plurality of groups of sampling sets with the decision level amplitude, so as to determine a first quantity and a second quantity, wherein the first quantity is a quantity of the demodulation level amplitude that is greater than or equal to the decision level amplitude, and the second quantity is a quantity of demodulation level amplitude that is less than the decision level amplitude; determine the processed signal to be greater than or equal to the preset decision signal in a case where the first quantity is greater than or equal to the second quantity; and determine the processed signal to be less than the preset decision signal in a case where the first quantity is less than the second quantity.

It shall be understood that, in the embodiments of the present disclosure, the "module" may be a portion of a circuit, a portion of a processor, a portion of a program or software, etc. It may also be a module, and may also be non-modular. Further, each component in the embodiments of the present disclosure may be integrated into one processing module, or each module may be physically present separately, or two or more modules may be integrated in a module. The above-mentioned integrated modules may be implemented in a form of hardware or may be implemented in a form of software functional modules.

In a case where the integrated module is implemented in the form of a software functional module rather than being sold or used as an independent product, the integrated module may be stored in a computer readable storage medium. Based on such an understanding, the technical solutions of the embodiment of the present disclosure essentially, or the part contributing to the prior art, or all or part of the present technical solution may be implemented in a form of a software product. The computer software product is stored in a storage medium, and includes certain instructions for enabling a computer device (which may be a personal computer, a server, or a network device, etc.) or a processor to execute all or part of the steps of the method as described in the embodiments of the present disclosure. The afore-mentioned storage medium includes various media capable of storing program codes, such as a USB flash disk, a mobile hard disk, a read only memory (ROM), a random access memory (RAM), a magnetic disk, compact disk, or other media that can store program code.

Therefore, the embodiments of the present disclosure provide a computer storage medium, and the computer storage medium stores a signal demodulation program. The signal demodulation program implements the steps of the method according to any one of the afore-mentioned embodiments when being executed by at least one processor.

Figure 9:
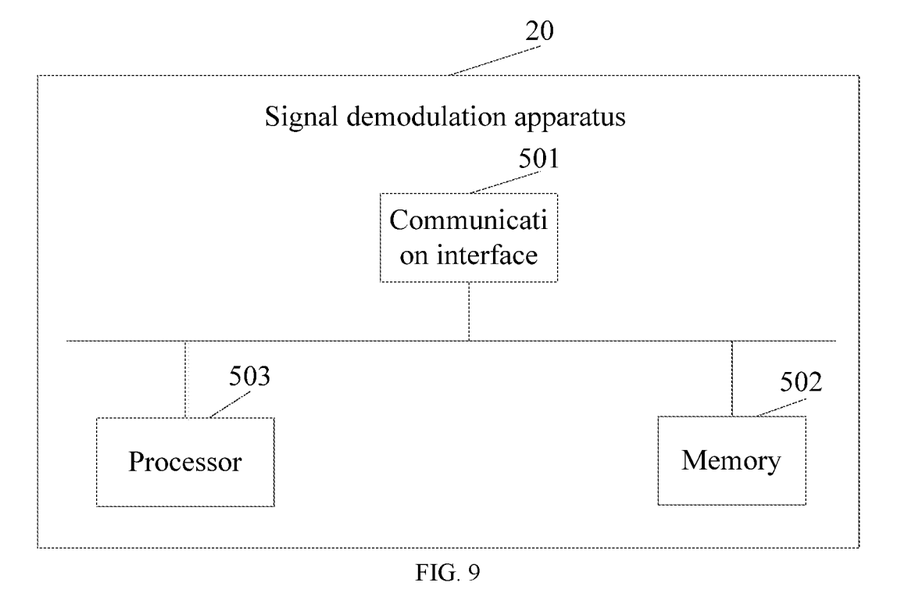
FIG. 9 is a schematic diagram of specific hardware structures of a signal demodulation apparatus provided by an embodiment of the present disclosure.

Based on the above-mentioned structure of the signal demodulation apparatus 20 and the computer storage medium, referring to FIG. 9, a schematic diagram of a specific hardware structure of a signal demodulation apparatus 20 provided by an embodiment of the present disclosure is shown. As shown in FIG. 9, the signal demodulation apparatus 20 may comprise: a communication interface 501, a memory 502 and a processor 503, wherein the individual components are coupled together by means of a bus device 504. It can be understood that the bus device 504 is used to implement connection communication between these components. In addition to a data bus, the bus device 504 further comprises a power bus, a control bus, and a state signal bus. However, for clarity of illustration, various buses are marked as bus device 504 in FIG. 9. In the signal demodulation apparatus 20, the communication interface 501 is used for receiving and sending signals in the process of sending and receiving information with other external network elements;

the memory 502 is used for storing a computer program capable of operating on the processor 503;

the processor 503 is used for executing the following steps when operating the computer program:

acquiring a signal to be demodulated;

performing direct current blocking and bias processing on the signal to be demodulated to obtain a processed signal; and comparing the processed signal with a preset decision signal, and obtaining a demodulation signal according to a comparison result.

It may be understood that the memory 502 in the embodiments of the present disclosure may be a volatile memory or a nonvolatile memory, or may include both a volatile memory and a nonvolatile memory. The nonvolatile memory can be a read-only memory (ROM), a programmable ROM (PROM), an erasable programmable read-only memory (EPROM), an electrically programmable read-only memory (EEPROM) or a flash memory. The volatile memory may be a random access memory (RAM), which is used as an external cache. By way of exemplary description but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 502 of the devices and methods as described in the present disclosure includes but is not limited to these and any other proper types of memories.

The processor 503 may be an integrated circuit chip with a signal processing capacity. In an implementation process, each step of the above-mentioned methods may be completed by an integrated logic circuit of hardware in the processor 503 or an instruction in the form of software. The above-mentioned processor 503 may be a general-purpose processor, a digital signal processor (DSP), an application-specific integrated circuit (ASIC), a field programmable gate array (FPGA) or other programmable logic devices, discrete gates or transistor logic devices, and discrete hardware components. Various methods, steps, and logical block diagrams as disclosed in the embodiments of the present disclosure may be implemented or executed. The general-purpose processor may be a microprocessor, or the processor may also be any conventional processor or the like. The steps in combination with the method as disclosed in the embodiments of the present disclosure may be directly embodied to be executed and completed by a hardware decoding processor, or to be executed and completed by using a combination of hardware and software modules in the decoding processor. The software module may be located in a storage medium mature in the art, such as a random access memory, a flash memory, a read-only memory, a programmable read-only memory or electrically erasable programmable memory, a register, and the like. The storage medium is located in the memory 502, and the processor 503 reads the information in the memory 502 and completes the steps in the above-mentioned method in combination with hardware thereof.

It may be understood that these embodiments as described in the present disclosure may be implemented by hardware, software, firmware, middleware, microcode, or a combination thereof. For hardware implementations, the processing module may be implemented in one or more application specific integrated circuits (ASIC), a digital signal processing (DSP), a digital signal processing device (DSPD), a programmable logic device (PLD), a field programmable gate array (FPGA), a general-purpose processor, a controller, a microcontroller, a microprocessor, other electronic modules for performing the functions as described in the present disclosure, or a combination thereof.

For software implementation, the technology as described in the present disclosure may be implemented by modules (e.g., procedures, functions, etc.) that perform the functions as described in the present disclosure. The software code may be stored in the memory and executed by the processor. The memory may be implemented in the processor or outside the processor.

Optionally, as another embodiment, the processor 503 is further configured to execute the steps of the method according to any one of the afore-mentioned embodiments when operating the computer program.

Figure 10:
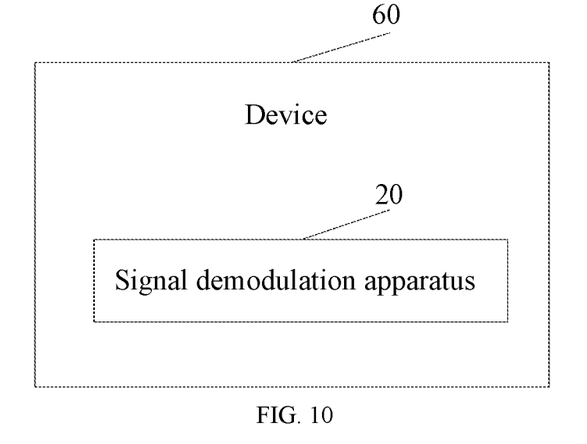
FIG. 10 is a schematic structural diagram of a device provided by an embodiment of the present disclosure.

Based on the above-mentioned structure of the signal demodulation apparatus 20 and the schematic diagram of the hardware structure, referring to FIG. 10, a schematic structural diagram of a device 60 provided by an embodiment of the present disclosure is shown. As shown in FIG. 10, the device 60 at least comprises the signal demodulation apparatus 20 according to any one of the afore-mentioned embodiments. For the signal demodulation device 60, dynamic changes of a direct current component caused by average power changes of the carrier signal can be avoided by means of performing direct current blocking processing on the modulation signal, so that error demodulation of the modulation signal can be avoided; performing bias processing after the direct current blocking on the modulation signal can further realize a decision on an alternating current signal without introducing a negative pressure source. In addition, performing a real-time decision on the processed signal by utilizing the preset decision signal can dynamically adapt the average power of the carrier signal, thereby ensuring the correct demodulation of the modulation signal and improving the accuracy of the demodulation result.

The above description are merely preferred embodiments of the present disclosure and are not intended to limit the protection scope of the present disclosure.

It should be noted that, herein, the terms "comprising", "including" or any other variation thereof herein are intended to encompass a non-exclusive inclusion, such that a process, a method, an article, or a device comprising a series of elements not only includes those elements, but also includes other elements not expressly listed, or further includes an element inherent to such a process, method, article, or apparatus. Without further limitation, an element defined by the phrase "comprising one . . . " does not exclude the existence of other identical elements in a process, a method, an article or a device that includes the element.

The above-mentioned serial numbers of the embodiments of the present disclosure are only for description, and do not represent the advantages or disadvantages of the embodiments.

The methods disclosed in the several method embodiments provided in the present disclosure can be arbitrarily combined under the condition of no conflict to obtain new method embodiments.

The features disclosed in the several product embodiments provided in the present disclosure may be arbitrarily combined without conflict to obtain new product embodiments.

The features disclosed in the several method embodiments or device embodiments provided in the present disclosure may be combined arbitrarily without conflict to obtain new method embodiments or device embodiments.

The above description is only specific embodiments of the present disclosure. However, the protection scope of the present disclosure is not limited to it, and any person skilled in the art can easily think of changes or substitutions within the technical scope as disclosed by the present disclosure, which should be included within the protection scope of the present disclosure. Therefore, the protection scope of the present disclosure shall be determined by the protection scope of the claims.

INDUSTRIAL PRACTICABILITY

Embodiments of the present disclosure provide a signal demodulation method and apparatus, a computer storage medium and a device. The method comprises: acquiring a signal to be demodulated; performing direct current blocking and bias processing on the signal to be demodulated to obtain a processed signal; and comparing the processed signal with a preset decision signal, and obtaining a demodulation signal according to a comparison result. Thus, dynamic changes of a direct current component caused by average power changes of the carrier signal can be avoided by means of performing direct current blocking processing on the modulation signal, so that the error demodulation of the modulation signal can be avoided; performing bias processing after the direct current blocking on the modulation signal can further realize a decision on an alternating current signal without introducing a negative pressure source. In addition, performing a real-time decision on the processed signal by utilizing the preset decision signal can dynamically adapt the average power of the carrier signal, thereby ensuring the correct demodulation of the modulation signal and improving the accuracy of the demodulation result.

What is claimed is:

1. A signal demodulation method, comprising:
acquiring a signal to be demodulated;
performing direct current blocking and bias processing on the signal to be demodulated to obtain a processed signal; and
comparing the processed signal with a preset decision signal, and obtaining a demodulation signal according to a comparison result,
wherein said acquiring a signal to be demodulated comprises:
receiving an optical power signal;
performing photoelectric conversion on the optical power signal to obtain a modulation signal; and
performing low-pass filtering processing on the modulation signal to obtain the signal to be demodulated, wherein said performing direct current blocking and bias processing on the signal to be demodulated to obtain a processed signal comprises:
  performing direct current blocking processing on the signal to be demodulated to obtain an alternating current signal;
  superposing the alternating current signal with a preset bias voltage signal to obtain a superposed signal; and
  performing gain processing on the superposed signal according to a preset gain coefficient to obtain the processed signal,
wherein said performing gain processing on the superposed signal according to a preset gain coefficient to obtain the processed signal comprises:
  performing gain processing on the alternating current signal in the superposed signal based on a first preset gain coefficient, and performing gain processing on the preset bias voltage signal in the superposed signal based on a second preset gain coefficient, so as to obtain the processed signal, wherein the first preset gain coefficient is equal to or not equal to the second preset gain coefficient.

2. The signal demodulation method of claim 1, wherein before comparing the processed signal with the preset decision signal, the method further comprises:
  performing gain processing on the preset bias voltage signal according to the second preset gain coefficient, so as to obtain the preset decision signal.

3. The signal demodulation method of claim 1, wherein in a case where the first preset gain coefficient is not equal to the second preset gain coefficient and the second preset gain coefficient is equal to 1, the method further comprises:
  determining the preset bias voltage signal as the preset decision signal.

4. The signal demodulation method of claim 1, wherein said comparing the processed signal with a preset decision signal, and obtaining a demodulation signal according to a comparison result, comprises:
  comparing the processed signal with the preset decision signal;
  deciding the demodulation signal as a first digital signal in a case where the processed signal is greater than or equal to the preset decision signal; and
  deciding the demodulation signal as a second digital signal in a case where the processed signal is less than the preset decision signal.

5. The signal demodulation method of claim 4, wherein level amplitude of the first digital signal is 1, and level amplitude of the second digital signal is 0.

6. The signal demodulation method of claim 4, wherein said comparing the processed signal with the preset decision signal comprises:
  performing a plurality of sampling on the processed signal and the preset decision signal, so as to obtain a plurality of groups of sampling sets, wherein each group of sampling sets comprises demodulation level amplitude obtained by sampling the processed signal and decision level amplitude obtained by sampling the preset decision signal;
  comparing the demodulation level amplitude in each group of sampling sets within the plurality of groups of sampling sets with the decision level amplitude, so as to determine a first quantity and a second quantity, wherein the first quantity is a quantity of the demodulation level amplitude that is greater than or equal to the decision level amplitude, and the second quantity is a quantity of demodulation level amplitude that is less than the decision level amplitude;
  determining the processed signal to be greater than or equal to the preset decision signal in a case where the first quantity is greater than or equal to the second quantity; and
  determining the processed signal to be less than the preset decision signal in a case where the first quantity is less than the second quantity.

7. A signal demodulation apparatus, wherein the signal demodulation apparatus comprises a memory and a processor, and wherein
  the memory is configured to store a computer program capable of operating on the processor; and
  the processor is configured to execute a signal demodulation method when operating the computer program,
wherein the signal demodulation method comprises:
  acquiring a signal to be demodulated;
  performing direct current blocking and bias processing on the signal to be demodulated to obtain a processed signal; and
  comparing the processed signal with a preset decision signal, and obtaining a demodulation signal according to a comparison result,
wherein said acquiring a signal to be demodulated comprises:
  receiving an optical power signal;
  performing photoelectric conversion on the optical power signal to obtain a modulation signal; and
  performing low-pass filtering processing on the modulation signal to obtain the signal to be demodulated,
wherein said performing direct current blocking and bias processing on the signal to be demodulated to obtain a processed signal comprises:
  performing direct current blocking processing on the signal to be demodulated to obtain an alternating current signal;
  superposing the alternating current signal with a preset bias voltage signal to obtain a superposed signal; and
  performing gain processing on the superposed signal according to a preset gain coefficient to obtain the processed signal,
wherein said performing gain processing on the superposed signal according to a preset gain coefficient to obtain the processed signal comprises:
  performing gain processing on the alternating current signal in the superposed signal based on a first preset gain coefficient, and performing gain processing on the preset bias voltage signal in the superposed signal based on a second preset gain coefficient, so as to obtain the processed signal, wherein the first preset gain coefficient is equal to or not equal to the second preset gain coefficient.

8. The signal demodulation apparatus of claim 7, wherein before comparing the processed signal with the preset decision signal, the method further comprises:
  performing gain processing on the preset bias voltage signal according to the second preset gain coefficient, so as to obtain the preset decision signal.

9. The signal demodulation apparatus of claim 7, wherein said comparing the processed signal with a preset decision signal, and obtaining a demodulation signal according to a comparison result, comprises:
  comparing the processed signal with the preset decision signal;

deciding the demodulation signal as a first digital signal in a case where the processed signal is greater than or equal to the preset decision signal; and deciding the demodulation signal as a second digital signal in a case where the processed signal is less than the preset decision signal.

10. The signal demodulation apparatus of claim 9, wherein said comparing the processed signal with the preset decision signal comprises:

performing a plurality of sampling on the processed signal and the preset decision signal, so as to obtain a plurality of groups of sampling sets, wherein each group of sampling sets comprises demodulation level amplitude obtained by sampling the processed signal and decision level amplitude obtained by sampling the preset decision signal;

comparing the demodulation level amplitude in each group of sampling sets within the plurality of groups of sampling sets with the decision level amplitude, so as to determine a first quantity and a second first quantity, wherein the first quantity is a quantity of the demodulation level amplitude that is greater than or equal to the decision level amplitude, and the second quantity is a quantity of demodulation level amplitude that is less than the decision level amplitude;

determining the processed signal to be greater than or equal to the preset decision signal in a case where the first quantity is greater than or equal to the second quantity; and determining the processed signal to be less than the preset decision signal in a case where the first quantity is less than the second quantity.

11. A non-transitory computer storage medium, wherein the computer storage medium stores a signal demodulation program, which implements a signal demodulation method when being executed by at least one processor, wherein the signal demodulation method comprises:

acquiring a signal to be demodulated;

performing direct current blocking and bias processing on the signal to be demodulated to obtain a processed signal; and comparing the processed signal with a preset decision signal, and obtaining a demodulation signal according to a comparison result, wherein said acquiring a signal to be demodulated comprises:

receiving an optical power signal;

performing photoelectric conversion on the optical power signal to obtain a modulation signal; and performing low-pass filtering processing on the modulation signal to obtain the signal to be demodulated, wherein said performing direct current blocking and bias processing on the signal to be demodulated to obtain a processed signal comprises:

performing direct current blocking processing on the signal to be demodulated to obtain an alternating current signal;

superposing the alternating current signal with a preset bias voltage signal to obtain a superposed signal; and performing gain processing on the superposed signal according to a preset gain coefficient to obtain the processed signal, wherein said performing gain processing on the superposed signal according to a preset gain coefficient to obtain the processed signal comprises:

performing gain processing on the alternating current signal in the superposed signal based on a first preset gain coefficient, and performing gain processing on the preset bias voltage signal in the superposed signal based on a second preset gain coefficient, so as to obtain the processed signal, wherein the first preset gain coefficient is equal to or not equal to the second preset gain coefficient.

12. The computer storage medium of claim 11, wherein said comparing the processed signal with a preset decision signal, and obtaining a demodulation signal according to a comparison result, comprises:

comparing the processed signal with the preset decision signal;

deciding the demodulation signal as a first digital signal in a case where the processed signal is greater than or equal to the preset decision signal; and deciding the demodulation signal as a second digital signal in a case where the processed signal is less than the preset decision signal.

* * * * *